United States Patent [19]

Bergler et al.

[11] Patent Number: 5,717,927
[45] Date of Patent: Feb. 10, 1998

[54] TELEPHONE OPERATING AS A TELECOMMUNICATIONS TERMINAL

[75] Inventors: Frank Bergler, Niefern; Uwe Käuffert, Pforzheim, both of Germany

[73] Assignee: Alcatel NV, Netherlands

[21] Appl. No.: 506,832

[22] Filed: Jul. 25, 1995

[30] Foreign Application Priority Data

Aug. 9, 1994 [DE] Germany ............... 44 28 068.8

[51] Int. Cl.[6] .................. G06F 9/06; G06F 9/44; G06F 9/40; G06F 9/445

[52] U.S. Cl. .............. 395/676; 395/651; 395/652; 395/653; 395/200.2; 364/DIG. 1; 364/DIG. 2; 379/93

[58] Field of Search ............. 395/307, 250, 395/800, 309, 200.15, 667, 200.16, 200.1, 651, 652, 806, 2.09, 200.11, 670, 183.14, 183.21, 676; 364/DIG. 1, DIG. 2; 340/870.01; 348/649.12, 601, 565; 379/93, 98, 89, 96; 370/465, 402, 264

[56] References Cited

U.S. PATENT DOCUMENTS

| | | | |
|---|---|---|---|
| 5,291,479 | 3/1994 | Vaziri et al. | 370/264 |
| 5,374,982 | 12/1994 | Flohr | 348/12 |
| 5,404,522 | 4/1995 | Carmon et al. | 395/677 |
| 5,450,500 | 9/1995 | Brett | 382/162 |
| 5,483,530 | 1/1996 | Davis et al. | 370/465 |
| 5,528,595 | 6/1996 | Walsh et al. | 370/402 |

FOREIGN PATENT DOCUMENTS

| | | |
|---|---|---|
| 0447934 | 3/1991 | European Pat. Off. . |
| 0597186 | 5/1994 | European Pat. Off. . |
| 3428237 | 2/1986 | Germany . |
| 3438292 | 5/1986 | Germany . |
| 3721360 | 1/1989 | Germany . |
| 3921617 | 1/1990 | Germany . |
| 4105466 | 8/1992 | Germany . |
| 4128686 | 3/1993 | Germany . |
| 4228801 | 5/1993 | Germany . |
| 4141382 | 6/1993 | Germany . |
| 9004896 | 5/1990 | WIPO . |

OTHER PUBLICATIONS

"Standard telephone devices" by D. Andersen et al from Electric Communication, vol. 63, No. 63, 1989, pp. 32 to 38.
"Voice terminals in the IDSN—from pilot project to series production", by Hellmut Saupe, from Frequency 42, (1988) pp. 60 to 65.
Greve, Rotger H: "Der PC als multifunktionales Endgerat an ISDN-TK Anlagen". In" ntz Bd. 46, 1993, H.6, S.422–424, 427.
PDAs" "Gehife für die Jackentasche". In: Funkschau 12, 1993, S.8–12, 14, 16, 17, 22.

Primary Examiner—Daniel H. Pan
Attorney, Agent, or Firm—Ware, Fressola, Van Der Sluys & Adolphson LLP

[57] ABSTRACT

By using simple means, a telecommunications terminal can be expanded to a large number of functions. The telecommunications terminal is composed of a digital signal processor (DSP), an interface (LS, V.24, PCMCIA-S) for the input of software, and means to start the input and execute the software. The software for executing basic functions is fixed and software for executing special functions can be called up and loaded via the interface (LS, V.24, PCMCIA-S).

15 Claims, 2 Drawing Sheets

TELEPHONE OPERATING AS A TELECOMMUNICATIONS TERMINAL

TECHNICAL FIELD

The invention concerns a telecommunications terminal which is able to execute basic functions and/or special functions.

BACKGROUND OF THE INVENTION

Telecommunications terminals, particularly standard telephone sets with ever increasing numbers of performance features, can be found in the market. A differentiation is made between so-called apparatus categories, which are: single piece devices which are compact and attractively priced and contain basic features such as multifrequency dialing, terminal holder and redialing. It has a single circuit board with the corresponding electronic components, which is integrated into the handset.

Two-part devices have a number of executable performance features that vary from features such as in the one-piece devices, to devices with "peak comfort".

Furthermore, there are also cordless telephones containing their own devices for other functions, such as a call answerer.

The structure of classic electronic telephone devices was taken from conventional electro-mechanical telephones. However, new performance features require new components or chips, on the average about one circuit per function. Thus, the expansion of an existing terminal with a fixed number of performance features cannot be achieved without problems, in the same way as adapting a device to the variations of different countries ("Standard telephone devices"; by D. Andersen et al from: Electric Information, volume 63, number 1, 1989, pages 32 to 38).

Another example from the state of the art also describes that the essential functions of an ISDN device are performed by "firmware". The firmware helps to execute the communications and device control functions, but also comfort performance features. An expansion of existing devices is achieved by adding new circuit and firmware components or by exchanging parts ("Voice terminals in the ISDN—from pilot project to series production" by: Hellmut Saupe, from: Frequency 42 (1988), pages 60 to 65).

SUMMARY OF THE INVENTION

It is the task of the invention to create a telecommunications terminal which can be expanded by simple means, so that it can execute a number of basic functions and special functions.

This is achieved by the invention with the principle of the first and the fifth patent claim.

It has the advantage that each telecommunications terminal constructed according to the invention can execute any desired function, thus every special function as well. In addition, the expansion can be realized in a cost-effective manner, and the expanded telecommunications terminals can be small in size.

It is furthermore advantageous that the functions that are important to each user of the telecommunications terminal are available to him at any time, or at least it is possible to implement the new functions and make them available in the shortest time, without great effort.

The present invention can be advantageous in that new special functions can be made available to the telecommunications terminal with a PCMCIA card through a PCMCIA card interface. PCMCIA cards represent a compact and practical solution.

BRIEF DESCRIPTION OF THE DRAWINGS

In the following, the invention will be explained in more detail by means of configuration examples and the figures. The following figures depict.

BEST MODE FOR CARRYING OUT THE INVENTION

In the following, the basic embodiment of the invention will be explained in greater detail by means of FIGS. 1a, 1b, 1c.

A telecommunications terminal comprises a digital signal processor DSP. Different configurations of the digital signal processor can be envisioned, for example a signal processor with an internal multiple writable and deletable memory, e.g. a flash EPROM, or with a one-time writable memory, which can always be read, e.g. an EPROM.

The digital signal processor DSP serves to store software for executing basic functions and/or special functions. In this case basic functions mean those, among others, which make the telecommunications terminal ISDN-capable. The special functions can be any imaginable functions, as will be explained later on.

The digital signal processor DSP serves to control the execution of the basic functions and/or to control the execution of the special functions.

The telecommunications terminal further comprises an interface LS, V.24, PCMCIA-S. This serves to input software for executing special functions.

Figure 1A:
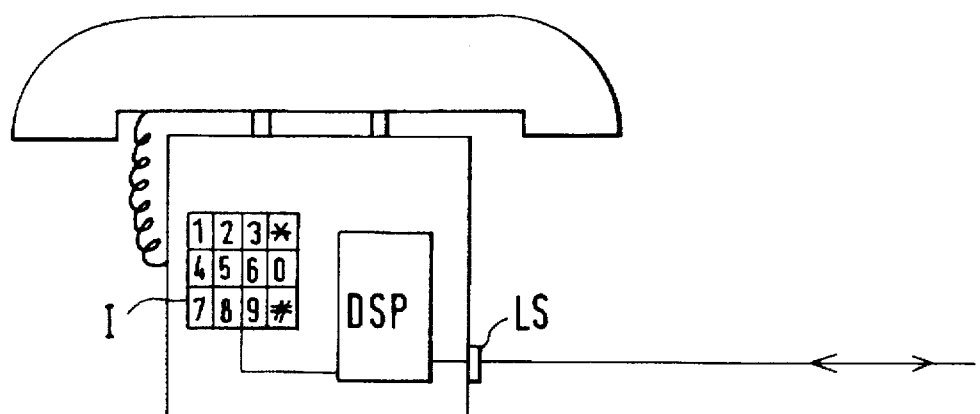
FIGS. 1a–c are a block circuit diagram of a telecommunications terminal with a) a line interface b) a V.24 interface c) a PCMCIA card interface FIG. 2 a flow diagram of a process of executing basic functions and/or special functions in a telecommunications terminal according to the present invention.
Figure 1B:
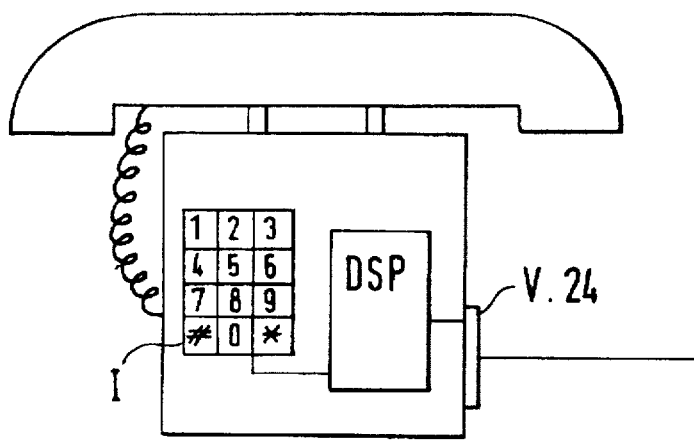

The interface in FIG. 1a is a line interface (LS), and in FIG. 1b it is a V.24 interface V.24. In FIG. 1c, the interface is a PCMCIA card interface PCMCIA-S.

Based on the different configuration of the interface in FIG. 1a, software for executing special functions is requested via an official exchange line e.g., and loaded accordingly into the telecommunications terminal. To reduce memory space, only the software actually needed to execute special functions is loaded. After its use, the software is deleted and other software can be loaded and the software used previously is overwritten.

If the interface is configured according to FIG. 1b, the software for the execution is loaded through the V.24 interface from a dam processing terminal, e.g. a PC. The software can then remain stored, or be used only once.

Figure 1C:
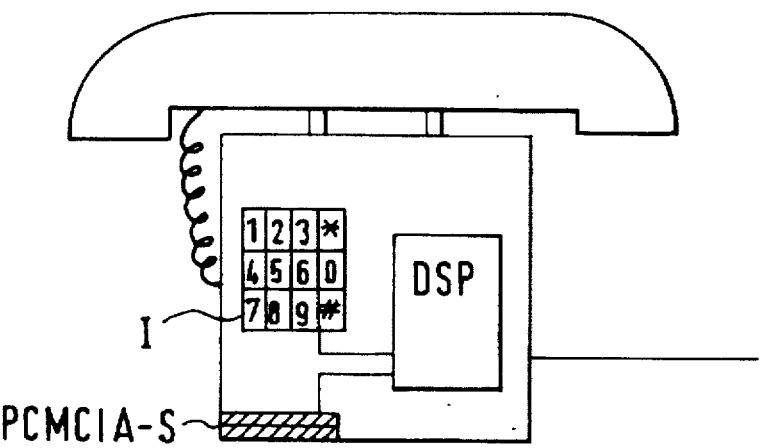

According to FIG. 1c, a PCMCIA card is inserted into the interface. The software for executing special functions is stored on the card and can be accessed as desired.

The telecommunications terminal also comprises means I to start the input of software and execute the special functions through interface LS, V.24, PCMCIA-S.

The means I to start the input also serve to call up and supply software to execute basic functions and/or software to execute special functions. To that end, stored software to execute basic functions and/or software to execute special functions is called up from a memory and supplied to the digital signal processor DSP.

The mentioned means I for starting can be the keys of a keyboard e.g., or also means for input through a touch-sensitive display unit, a so-called touch-screen. Accordingly for example, pressing a key triggers the input of software to execute special functions via interface LS, V.24, PCMCIA-S. The software can then either be stored in the digital signal processor DSP, or remains on stand-by for a one-time utilization. The availability of software for executing basic functions and/or software for executing special functions is also triggered by the means I for starting.

Figure 2:
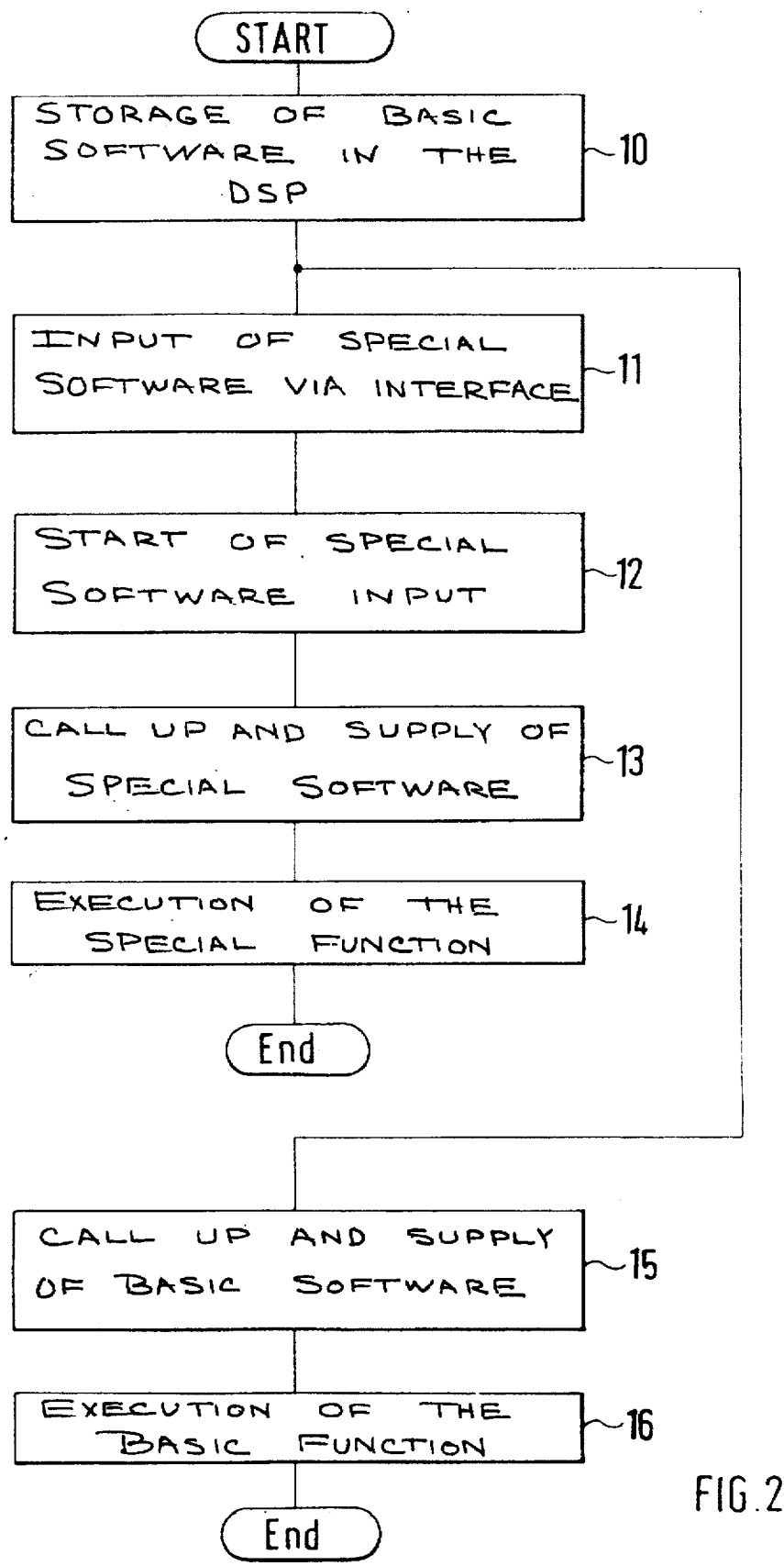

By means of FIG. 2, the following explains the method of the invention to execute basic functions and special functions with a telecommunications terminal that contains a digital signal processor DSP. The method comprises the following steps:

In a first step 10, software for executing basic functions, hereinafter called basic software, is stored in the memory of the digital signal processor DSP. The basic software can either be stored in the memory of the digital signal processor DSP itself before starting, or is already available when the device is purchased. In a next step 11, software for executing special functions, hereinafter called special software, is input via an interface LS, V.24, PCMCIA-S. The input of special software begins with a next step 12. During a following step 13, the special software is called up and supplied to the digital signal processor DSP. The special functions are executed in a subsequent step 14.

In the event a basic function is to be executed, the basic software already stored according to step 10 is called up in a next step 15, and supplied to the digital signal processor DSP for processing. A basic function is executed in another final step 16.

The following provides an overview of the potentially executable special functions. The basic functions are also listed. The following lists do not make any claim of completeness and only provide an overview of random functions.

The following are basic functions which can be executed with a telecommunications terminal according to the invention:

ISDN functionality—layer 1, 2, 3

Data storage and data output

The following are executable special functions for example:

Fax functionality, for example fax group 3

Data functionality, V.24 interface simulation, Hayes standard, V.25 bis according to CCITT: X.25 (teletext, fax group 4), X.400, X.21

Video functionality, CCITT: H.221, H.261, H.242, MPEG, JPEG

ETHERNET

ISDN functionality, user surface

Audio functionality, intercom function

BTX functionality

Digital call answerer, voice functions (voice recognition, etc.)

All these functions and protocols can be loaded into the telecommunications terminal. The processing of the protocols and functions is performed by the digital signal processor DSP. In accordance with the preceding list, the user of a telecommunications terminal is able for example to expand the telecommunications terminal by loading software so that he can send and receive a facsimile, or so that he has a digital call answerer available. The executable special functions can be expanded to a large number of functions of any kind. The basic functions are available, but can be expanded at any time.

As is known today, with further development of a digital signal processor DSP, it will also be possible to make functions, which are performed by a telecommunications terminal, to be loadable into a digital signal processor DSP. It can be imagined for example that these telecommunications installation functions are loaded into a digital signal processor DSP by means of a PCMCIA card. It can further be imagined that the software for the function of a telecommunications installation is loaded into a telecommunications terminal by means of a PCMCIA card, and is then transmitted from there to the telecommunications installation. In this way, the functions stored in the digital signal processor DSP of the telecommunications installation are available to a large number of telecommunications terminals.

What is claimed is:

1. A telephone operating as a telecommunications terminal for executing basic telecommunications functions and/or special telecommunications functions, the telephone comprising a digital signal processor (DSP) for storing at least one basic telecommunications function and for controlling the execution of the at least one basic telecommunications function, the DSP having a memory for storing the at least one basic telecommunications function;

an external interface controlled by the DSP for inputting software for executing special telecommunications functions; and a user interface means for interfacing with the DSP so as to cause the DSP to acquire via the external interface a special telecommunications function, to cause the DSP to store same, and to cause the DSP to execute the stored telecommunications function;

wherein a special telecommunications function is deleted from the DSP memory after it is executed but the basic telecommunications functions are not deleted after being executed.

2. A telephone as claimed in claim 1 wherein the external interface for inputting software is a PCMCIA.

3. A telephone as claimed in claim 1 wherein the user interface means is a keyboard.

4. A telephone as claimed in claim 1 wherein the special telecommunications functions are functions for transmitting and receiving data.

5. A method of inputting software for executing special functions into a telephone as claimed in claim 1, comprising the steps of:

sending a request for software for executing special functions from the means (I) via the external interface (LS, V.24, PCMCIA-S);

reading the requested software from a further means (II) via the external interface and transferring it via the external interface to the digital signal processor (DSP); and controlling the execution of the special functions by means of the digital signal processor (DSP).

6. A method as claimed in claim 3 wherein the further means (II) is a server in a telecommunications system.

7. A method as claimed in claim 5 wherein the further means (II) is a data processor.

8. A method as claimed in claim 5 wherein the further means (II) is a PCMCIA card.

9. A telephone as claimed in claim 1 wherein the external interface for inputting software is a V.24 interface.

10. A telephone as claimed in claim 1 wherein the external interface for inputting software is a line interface.

11. A telephone as claimed in claim 1 wherein the means (I) for starting the input of software are means for input via a touch-sensitive display device.

12. A telephone as claimed in claim 1 wherein the special telecommunications functions are functions for compressing and playing back video data.

13. A telephone as claimed in claim 1 wherein the special functions are functions for transmitting and receiving facsimile signals.

14. A telephone as claimed in claim 1, wherein the basic telecommunications functions provide the telephone with at least a first lowest layer of ISDN functionality.

15. A method of executing basic telecommunications functions and/or special telecommunications functions in a telephone containing a digital signal processor (DSP), said method comprising the steps of:

storing software for executing basic telecommunications functions in the digital signal processor (DSP);

inputting software for executing special telecommunications functions via an external interface controlled by the DSP;

starting the input of software for executing the special telecommunications functions;

calling and making available software for executing special telecommunications functions and/or basic telecommunications functions; and executing the basic telecommunications functions and/or special telecommunications functions, wherein, when inputting software for executing special telecommunications functions, software for previously executed special telecommunications functions is overwritten to conserve space.

* * * * *